March 22, 1927.
F. J. MAHONEY
1,621,594
REVERSIBLE DRAFT, INDIVIDUAL BIN CIRCULATING APPARATUS
Filed Jan. 21, 1926  2 Sheets-Sheet 2
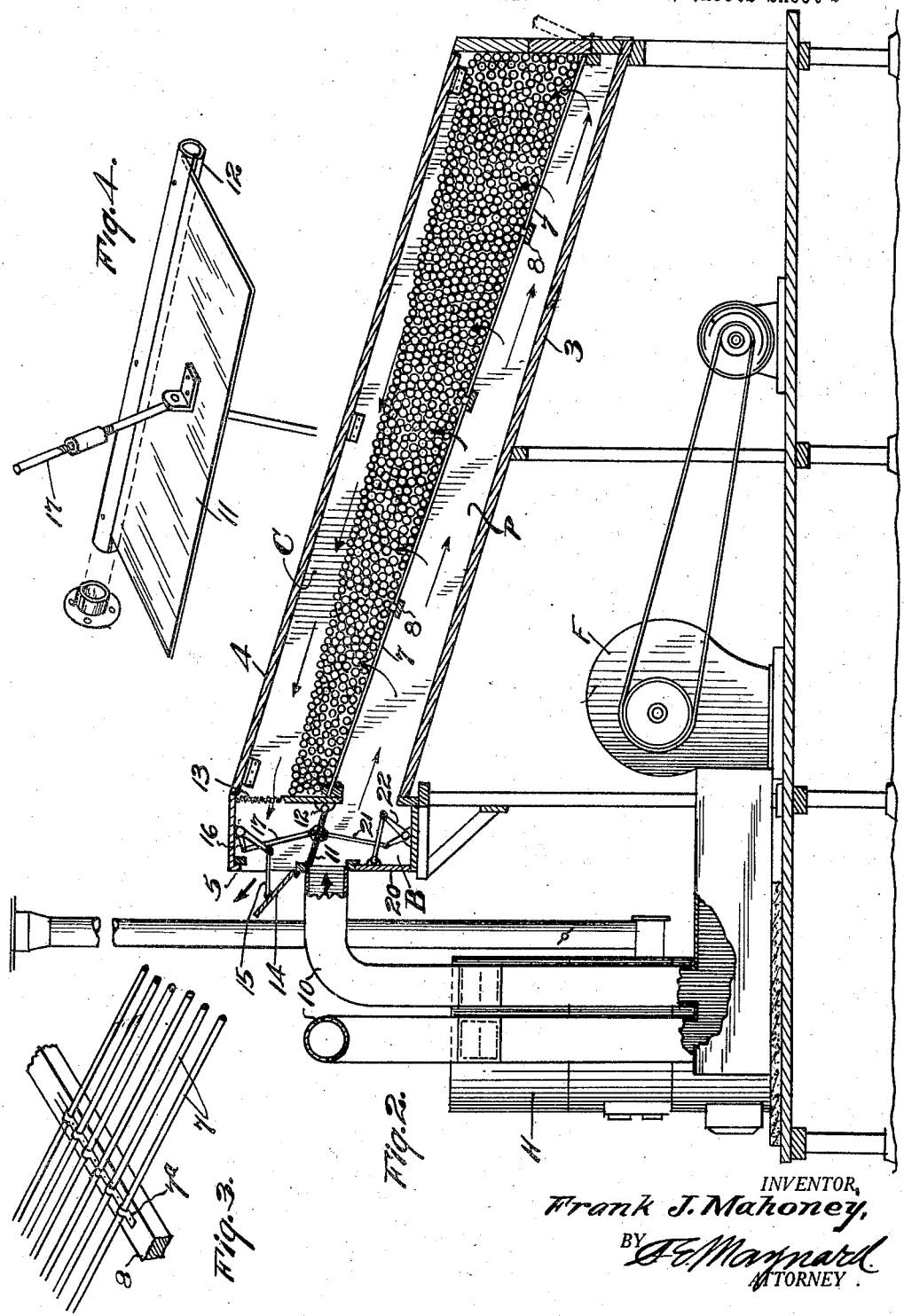
INVENTOR,
Frank J. Mahoney,
BY
ATTORNEY.

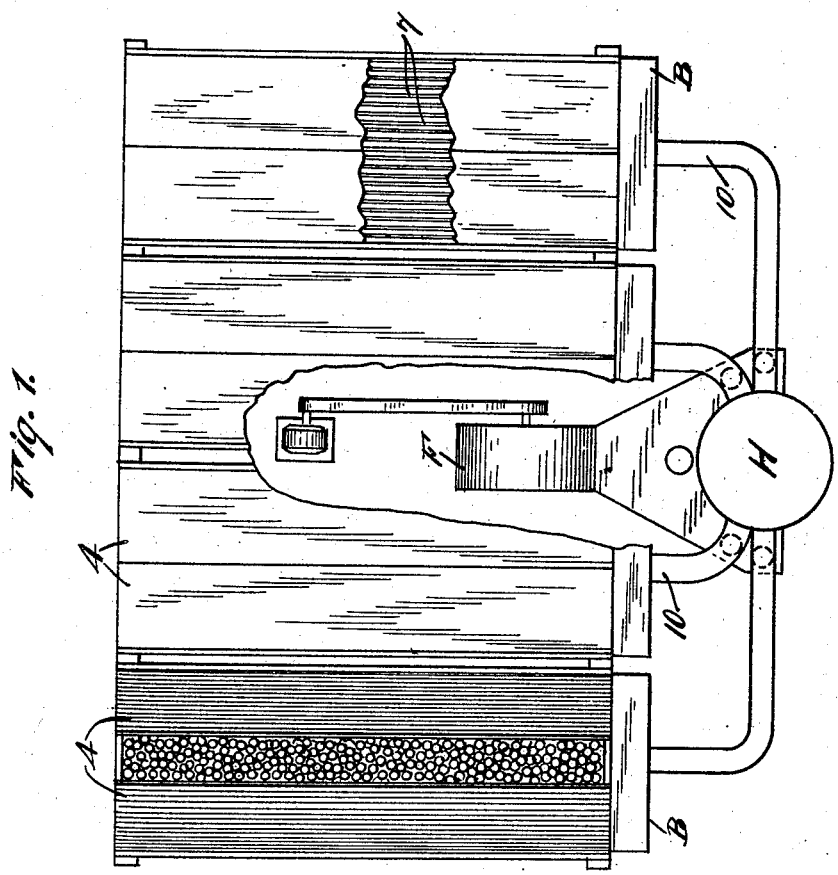

Patented Mar. 22, 1927.

UNITED STATES PATENT OFFICE.

FRANK J. MAHONEY, OF SATICOY, CALIFORNIA.

REVERSIBLE-DRAFT, INDIVIDUAL-BIN CIRCULATING APPARATUS.

Application filed January 21, 1926. Serial No. 82,747.

This invention relates to apparatus for facilitating the curing or drying of nuts and the like, and more especially English walnuts.

The present invention has for an object to provide an apparatus wherein circulation of warm air in and through any one of numerous bins may be controlled at will independently of others so that the various bins may be loaded, the nuts treated and then removed irrespective of the stage of treatment in other bins. The advantage of this is that the plant may be operated to highest efficiency by repeated use of each bin, as rapidly as possible during the rush harvesting season; the bins being served from a common heating furnace whose fire may be efficiently employed and kept up without waste as would occur if the several bins had to be loaded at one time, heat raised to warm air for circulation therein at one time.

By my present invention each bin of a series is individually served with warm air which can be alternated in direction of flow up through the batch and then down through the batch. The advantage of an up and down flow is that while the bin may be of a considerable width and any length the air will have only a comparatively thin depth of layer of walnuts to traverse and will act more quickly to dry the nuts since the moisture laden air will not have to impinge so many nuts in passing up through the thin layer as it would if travelling laterally across the wider width dimension. Moreover, the natural convection currents of heated air are of vertical tendency and this property is aided by vertical percolation through the interstices of the nut mass, whereas in any lateral flow system natural convection action is antagonistic with the result that the hot air tends to rise to the top of the chamber without much air movement through the lower layers of the nuts in the batch.

Additional objects and advantages will be made manifest in the following specification of apparatus showing an embodiment of the invention; it being understood that modifications, variations and adaptations may be resorted to within the spirit and scope, and principle of the invention as it is here claimed.

Figure 1 is a plan, broken away, of a four bin apparatus.

Figure 2 is an elevation and longitudinal, vertical section of the apparatus.

Figure 3 is a perspective of a portion of the "grizzly" shelf of a bin.

Figure 4 is a perspective of a circulation gate.

More in detail the new method and apparatus are as follows:

Erected upon a floor 2 is a bin structure including a series of bins disposed side by side and each having a bottom 3 and a top formed of longitudinal doors 4—4 which are swung up to allow loading and access to the bins. The bottom 3 and doors 4 are about parallel and tilt sharply down to the far end from their face 5. Between the bottom and the top doors is a shelf or "grizzly" preferably composed of small rods 7 (about $\frac{1}{4}$ inch diameter) placed about $\frac{1}{16}$ of an inch apart and supported on cross-bars 8. The shelf which forms the bottom of the nut chamber C, pitches down toward the lower end of the bottom 3.

Thus, there is formed below the chamber C a clear plenum passage P at the front end of which is a gate box B having a hot air conduit 10 leading to an air heater H which is supplied with air from a blower F.

At the mouth of the conduit 10 is a gate 11 hinged at 12 to swing up or down. When in the upper position (Fig. 2) hot air is directed down into passage P where head velocity carries much of the air to the bottom end of the passage the remainder flowing up through the batch of nuts on the grizzly shelf 7, whence the air passes upward to a head screen 13 and to box B and out of an open door 14 above the gate 11.

This door 14 is attached to the gate by suitable means, as a link 15, crank 16, and link 17. Below the gate is another door 20 connected by link 21 to a crank 22 which has a link 23 attached to the gate 11. When door 14 is opened it closes door 20 and lifts gate 11 to direct air to passage P.

After the air has been driven up through the batch of nuts for a period (variously determined) the attendant opens door 20 and thereby closes door 14 and pulls down gate 11. This results in completely inverting the direction of flow of heated air by causing it to pass downward through the batch and upward along the passage P to the now open door 20 and out from the apparatus.

After a desired period the circulation is again inverted and caused to pass upward through the nuts on the grizzly, by reversing the position of the gate and opening the top door 14 and closing the bottom door 20 (which parts as above stated, have concurrent action).

When desired the cover-door 4 may be opened on a crack while the gate is set in upper position (Fig. 2) and the air will then flow out past the cover-door 4.

It is apparent, therefore, that my method comprises alternately inverting the air flow through the depth of the batch, which, as far as I am aware is wholly new in walnut drying. I prefer that the depth of the mass of nuts is less than the width, therefore causing the air to pass through the least dimension of the batch. The smaller the dimension traversed, the less the amount of moisture in the air leaving the batch and consequently the greater the drying capacity.

By vertical traverse through the batch I overcome flow loss in pockets due to convection flow upward which occurs if the batch lies in horizontal position in its bin and if air flow is in cross flight.

The improved grizzly shelf is much superior to mere slats spaced apart edgewise for the reason that the rods are more durable, give less, have no fiber stripping off from effects of current, offer less resistance to passage of air, retain the heat and are self clearing; that is the débris does not adhere to them as it does to wooden slats.

By securing the rods 7 down upon the cross-pieces 8 by strips of box-strap iron 7ª, Fig. 3, the nuts readily roll down to the lower end of the grizzly when the bin is being emptied.

It will be seen that there is no cross-screen to catch and hold the rubbish and fibers, and that the present grizzly presents long openings or slots through which rubbish may freely pass and not block up the passages up and down through which the air is forced.

The invention claimed is:

1. Apparatus for drying nuts, comprising a bodily inclined horizontally disposed bin, means for serving heated air to the bin, and means for alternately inverting the flow of air in up and down movements through the batch of nuts in the bin; said inverting means including an air inlet and outlet device at the higher end of the bin.

2. Apparatus, for drying nuts, comprising a bin having a foraminous shelf to support the nuts and forming a lower air passage, an air conduit leading to the bin, a gate at the outlet of the conduit for diverting the air to pass to the top or to the bottom of the shelf, and upper and lower outlet doors for the air from above or below the shelf.

3. Apparatus, for drying nuts, comprising a bin having a foraminous shelf to support the nuts and forming a lower air passage, an air conduit leading to the bin, a gate at the outlet of the conduit for diverting the air to pass to the top or to the bottom of the dividing shelf, upper and lower outlet doors for the air from above or below the shelf, and means for concurrently operating the said doors and the gate to effect an alternate inversion of air flow through the nuts on the shelf.

4. Apparatus, for drying nuts, comprising a bin closed at the bottom and having movable top covers for loading and unloading and adjustable for venting the bin, a foraminous shelf in the bin, a box at one end of the bin opening to the spaces above and below the shelf, a hot air conduit leading to the box, a gate for alternately inverting air flow up and down through the shelf and nuts thereon, and upper and lower outlet doors for air after it passes through the nuts and shelf.

5. Apparatus, for drying nuts, comprising a bin having upper and lower compartments and an intermediate shelf having apertures for the passage of air, a hot air box communicating with the said compartments, a gate for alternately inverting air flow from the box and up or down through the shelf and nuts thereon, upper and lower outlet doors for air after it passes through the nuts, and means operatively connecting the gate and said doors for concurrent action to close one door and open the other and change the position of the gate.

FRANK J. MAHONEY.